United States Patent

Goulding et al.

(10) Patent No.: US 7,022,865 B2
(45) Date of Patent: Apr. 4, 2006

(54) PYRANS AS LIQUID CRYSTALS

(75) Inventors: Mark John Goulding, Ringwood (GB);
Warren Duffy, Southampton (GB);
Kevin Adlem, Bournemouth (GB);
Peer Kirsch, Seeheim-Jugenheim (DE);
Alexander Hahn, Rüsselsheim (DE);
Eike Poetsch, Mühltal (DE); Werner Binder, Dieburg (DE); Volker Meyer, Gross-Zimmern (DE); Melanie Klasen-Memmer, Heuchelheim (DE);
Michael Heckmeier, Hemsbach (DE);
Georg Lüssem, Petershausen (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/854,773

(22) Filed: May 27, 2004

(65) Prior Publication Data

US 2005/0012073 A1 Jan. 20, 2005

(30) Foreign Application Priority Data

May 27, 2003 (EP) .................................. 03011906

(51) Int. Cl.
*C07D 315/00* (2006.01)
*C09K 19/32* (2006.01)
*C07C 25/13* (2006.01)

(52) U.S. Cl. .................. 549/428; 252/299.61; 428/1.1; 570/144

(58) Field of Classification Search ................ 549/428; 252/299.61; 570/144; 428/1.1
See application file for complete search history.

(56) References Cited

U.S. PATENT DOCUMENTS

| 5,368,771 | A * | 11/1994 | Namekawa et al. ... 252/299.01 |
| 6,329,027 | B1 * | 12/2001 | Kondo et al. ................. 428/1.1 |
| 6,558,758 | B1 * | 5/2003 | Yanai et al. .................. 428/1.1 |
| 2004/0140452 | A1 * | 7/2004 | Hirschmann et al. .. 252/299.61 |

FOREIGN PATENT DOCUMENTS

DE 4132006 * 4/1993

OTHER PUBLICATIONS

English abstract of DE-4,132,006.*

* cited by examiner

*Primary Examiner*—Shean C. Wu
(74) *Attorney, Agent, or Firm*—Millen, White, Zelano & Branigan, P.C.

(57) ABSTRACT

A tetrahydropyran derivative comprising at least three cyclic rings and one aromatic endgroup of the formula A

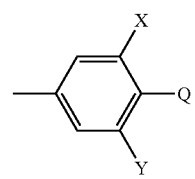

(A)

a process for preparing said tetrahydropyran derivatives, and the use of said tetrahydropyran derivatives as a component in a liquid crystal composition.

9 Claims, No Drawings

PYRANS AS LIQUID CRYSTALS

The invention relates to tetrahydropyran derivatives comprising at least three cyclic rings and one aromatic endgroup of the formula A

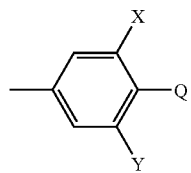
(A)

wherein
X, Y each is —H or —F, with the proviso that at least one of X and Y is —F,
Q is H, —CN, —NCS, $SF_5$, —F, —Cl, —$CF_3$, —$OCF_3$, —$OCHF_2$, $OCF_2CHFCF_3$, —$OCHFCF_3$ or —$OCF_2CF_3$.

In recent years, applicable fields of liquid crystals such as various kinds of display devices, electronic optical devices, liquid crystal sensors, etc. have markedly been enlarged, and accompanying this situation, liquid crystal compounds having various structures have been proposed. In liquid crystal materials particularly used for display devices, nematic liquid crystals are at present in mainstream, and a TN-type or a STN-type simple matrix system using the same and a TFT-type active matrix system in which a thin film transistor is provided to respective picture elements have been used.

It is known in the art to use tetrahydropyran derivatives as liquid crystal compounds.

DE-A 41 320 06 discloses heterocyclic compounds comprising a tetrahydropyrane ring or a dioxane ring. The compounds show according to the specification of DE-A 41 320 06 a good solubility for other components of liquid crystalline compositions, a high positive dielectric anisotropy and an advantageous viscosity. However, the property profile, especially the rotational viscosity, dielectric anisotropy and holding ratio of the compounds mentioned in DE-A 41 320 06 may be optimized.

U.S. Pat. No. 5,344,587 discloses an electro-optical liquid crystal system, which contains one or more compounds of the formula

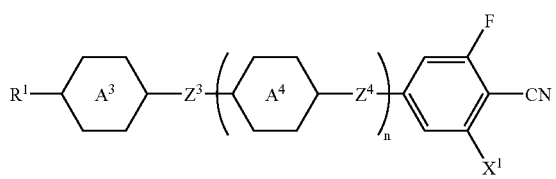

in which $R^1$ is for example alkyl, $Z^3$ and $Z^4$ are for example a single bond or —$CH_2CH_2$—, $A^3$ and $A^4$ are for example trans-1,4-cyclohexylene or 1,4-phenylene. Tetrahydropyran derivatives comprising an aromatic endgroup of formula A as mentioned above are not disclosed.

EP-A 0 511 487 discloses an electro-optical liquid crystal system which contains a dielectrically positive liquid crystal mixture which contains one or more compounds comprising an aromatic endgroup of formula A. Compounds comprising an aromatic endgroup of formula A and a tetrahydropyran ring are not disclosed in EP-A 0 511 487.

It is an object of the present invention to provide new tetrahydropyran derivatives which are suitable as components in liquid crystalline compositions, especially in nematic media having a positive dielectric anisotropy. It is a further object of the present invention to provide compounds having a balanced property profile of the following properties: rotational viscosity, dielectric anisotropy and holding ratio. It is further an object of the present invention to provide compounds having a good solubility for other components of liquid crystal compositions and a high positive dielectric anisotropy.

These objects can be achieved by providing tetrahydropyran derivatives of formula I

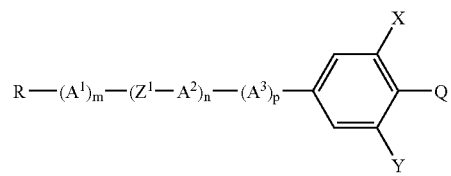
(I)

in which
R is H, an alkyl group, which is unsubstituted or substituted by at least one halogen atom or —CN, having from 1 to 12 C atoms, it is also being possible for one or more non adjacent $CH_2$-groups to be independently replaced by —O—, —S—, —CO—, —$CF_2$—,

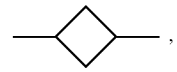,

CO—O—, —O—CO—, or —CH═CH—, preferably unsubstituted alkyl group having from 1 to 12, preferably from 1 to 5, C atoms,
$A^1$, $A^2$, $A^3$ are each independently
a) trans-1,4-cyclohexylene
b) tetrahydropyran-2,5-diyl,
c) 1,4-phenylene, it is also being possible for one or more non adjacent CH-groups to be replaced by N,
d) 1,4-bicyclo[2.2.2]octylene, piperidine-2,5-diyl,
e) naphthalene-2,6-diyl,
f) decahydronaphthalene-2,6-diyl,
g) 1,2,3,4-tetrahydronaphthalene-2,6-diyl,
h) 1,4-cyclohexenylene,
it is also being possible for the groups listed under c), e) and g) to be substituted with —CN, —Cl, —F or $OCF_3$,
preferably $A^1$, $A^2$, $A^3$ are each independently
a) trans-1,4-cyclohexylene,
b) tetrahydropyran-2,5-diyl,
c) 1,4-phenylene, it is also being possible for one or more non adjacent CH-groups to be replaced by N,
it is also being possible for the groups listed under c) to be substituted with —CN, —Cl, —F, or —$OCF_3$, preferably —F, or —$OCF_3$, more preferably —F, with the proviso that one of the groups $A^1$, $A^2$, or $A^3$ is tetrahydropyran-2,5-diyl,
Z is —CO—O—, —$CH_2O$—, —O—, —O—$CH_2$—, —$CH_2CH_2$—, —CH═CH—, —C≡C—, or a single bond, preferably —CO—O—, or a single bond
m is 0, 1, or 2, preferably m is 0 or 1,
n and p each is independently 0, 1 or 2, preferably n and p each are 0 or 1, but (m+n+p) is at least 2 and at most 4, preferably (m+n+p) is 2, X, Y each is —H or —F, with the proviso that at least one of X and Y is —F, Q is H, —CN, —NCS, —F, —Cl, —CF$_3$, —OCF$_3$, —OCHF$_2$, SF$_5$, —OCF$_2$CHFCF$_3$, —OCHFCF$_3$, or —OCF$_2$CF$_3$, preferably —F or —OCF$_3$.

The compounds of formula I are useful as components in liquid crystalline compositions. It is especially possible to provide liquid crystalline compositions having large nematic areas, excellent chemical stability and excellent elastic features, a low temperature dependence of the threshold voltage, and/or low optical anisotropy. The compounds of formula I further show a high positive dielectric anisotropy and an advantageous value of viscosity as well as a large $\epsilon_{195}$ at positive dielectric anisotropy and a low temperature dependence of the threshold voltage. It was found, that the combination of a tetrahydropyran group together with an endgroup of formula A

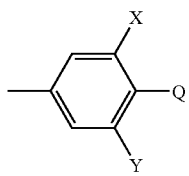
(A)

wherein

X, Y each is —H or —F, with the proviso that at least one of X and Y is —F,

Q is H, —CN, —NCS, —F, —Cl, —CF$_3$, —OCF$_3$, SF$_5$, —OCHF$_2$, —OCF$_2$CHFCF$_3$, —OCHFCF$_3$, or —OCF$_2$CF$_3$, preferably —F or —OCF$_3$, and at least three cyclic rings as realised in the tetrahydropyran derivatives of the present invention of formula I results in compounds having balanced properties, especially a high dielectric anisotropy, a good hydrolytic stability, a good rotational viscosity and a good holding ratio.

The alkyl group R of the compounds of formula I may be linear or branched, preferably the alkyl groups are linear. More preferably R is a linear alkyl group of the general formula C$_n$H$_{2n+1}$, wherein n is 1 to 10, preferably 1 to 7, more preferably R is methyl, ethyl, n-propyl, n-butyl, n-pentyl, n-hexyl, or n-heptyl.

However, it is also possible that R is a branched alkyl group, because of the better solubility of compounds of the formula I with branched alkyl groups in the generally used liquid crystalline basic materials, or especially as chiral dopants, when the compounds of the formula I having branched alkyl groups are optically active. Those branched alkyl groups contain usually not more than one branch. Preferred branched alkyl groups are isopropyl, 2-butyl (=1-methylpropyl), isobutyl (=2-methylpropyl), 2-methyl-butyl, isopentyl (=3-methylbutyl), 2-methylpentyl, or 3-methylpentyl.

Also included are besides the racemates of the tetrahydropyran derivatives their enantiomers—as the tetrahydropyran ring contains two chiral centers—and their resulting diastereomers derived from branched side chains represented by R.

In a preferred embodiment of the present invention tetrahydropyran derivatives are provided, wherein in the endgroup of the formula A

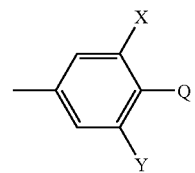
(A)

of the tetrahydropyran derivatives of formula I X, Y, and Q are —F.

In a further preferred embodiment one of X and Y in the endgroup of formula A is —F and the other one is —H, and Q is —OCF$_3$.

At least one of A$^1$, A$^2$ and A$^3$ is preferably trans-1,4-cyclohexylene, tetra-hydropyran-2,5-diyl, or one or two of A$^1$, A$^2$ and A$^3$ may be 1,4-phenylene, it is also being possible for one or more non adjacent CH-groups to be replaced by N, or CF, more preferably at least one of A$^2$ and A$^3$ is trans-1,4-cyclohexylene or 1,4-phenylene, with the proviso that one of the groups A$^1$, A$^2$, or A$^3$ is tetrahydropyran-2, 5-diyl. More preferably m is 0 and one of the groups A$^2$, or A$^3$ is tetrahydropyran-2,5-diyl.

In a further embodiment tetrahydropyran derivatives of formula (IA) are therefore provided

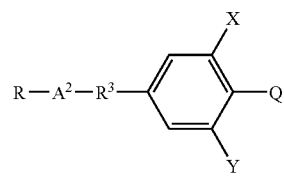
(IA)

in which

R is H, an alkyl group, which is unsubstituted or substituted by at least one halogen atom or —CN, having from 1 to 12 C atoms, it is also being possible for one or more non adjacent CH$_2$-groups to be independently replaced by —O—, —S—, —CO—, —CF$_2$—,

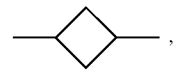,

—CO—O—, —O—CO—, or —CH=CH—,

A$^2$, A$^3$ are each independently a) trans-1,4-cyclohexylene, b) tetrahydropyran-2,5-diyl, c) 1,4-phenylene, it is also being possible for one or more non adjacent CH-groups to be replaced by N, or CF, preferably 1,4-phenylene, X, Y each is —H or —F, with the proviso that at least one of X and Y is —F, Q is H, —CN, —NCS, —F, —Cl, —CF$_3$, —OCF$_3$, —OCHF$_2$, SF$_5$, —OCF$_2$CHFCF$_3$, —OCHFCF$_3$, or —OCF$_2$CF$_3$, preferably —F or —OCF$_3$, with the proviso that one of the groups A$^2$, or A$^3$ is tetrahydropyran-2,5-diyl.

The compounds of formula I are prepared by methods known in the art, as disclosed in literature, for example in Houben-Weyl, *Methoden der organischen Chemie*, Georg- Thieme-Verlag, Stuttgart, under reaction conditions which are known and useful for said reactions.

The compounds of formula I are for example prepared by coupling of two suitable fragments:

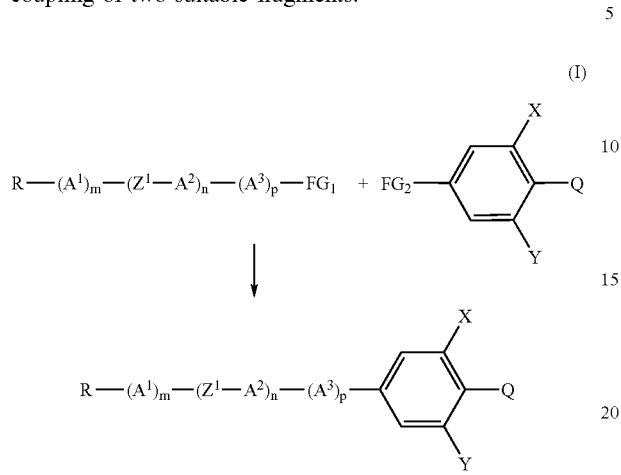

(I)

wherein $FG_1$ and $FG_2$ are functional groups, preferably selected from:

| -FG$_1$ | -FG$_2$ |
|---|---|
| =O | a metal containing group, which, for example, is Li, MgBr$_2$, ZnBr$_2$, ZnCl$_2$ or Zn |
| —Br | a metal containing group, which, for example, is Li, MgBr$_2$, ZnBr$_2$, ZnCl$_2$ or Zn |
| a metal containing group, which, for example, is Li, MgBr$_2$, ZnBr$_2$, ZnCl$_2$ or Zn | —Br | with the proviso if Q in formula I is —CN, or —NCS, the metal containing group, also identified as met hereinafter, must be a Zn derivative.

The two fragments are prepared by methods known in the art.

The starting materials used for the preparation of compounds of the formula I can be isolated or used in situ, which means that the starting materials are not isolated from the reaction mixture, but directly reacted to the compounds of formula I.

The compounds of formula I can for example be prepared according to the following schemes 1, 2, 3, and 4.

Scheme 1:

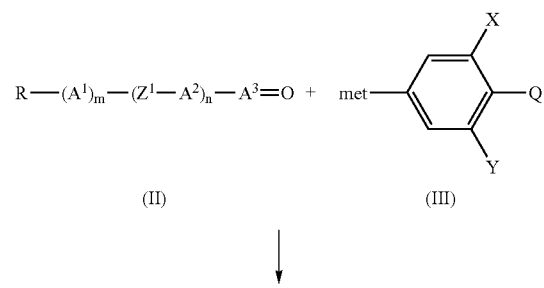

(II)     (III)

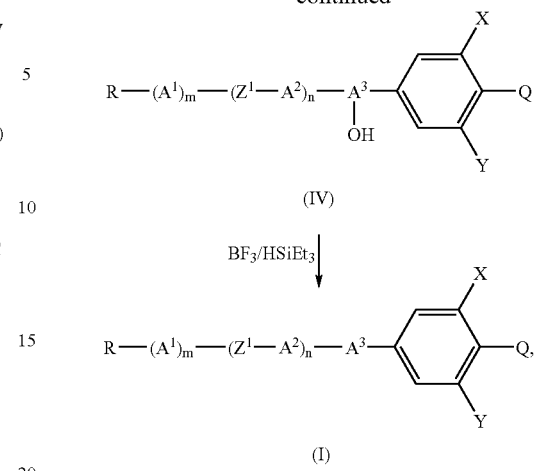

(IV)

BF$_3$/HSiEt$_3$ (I)

wherein p = 1 in Formula IIa: $A^3$=O is

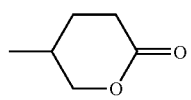

(if $A^1$ and $A^2$ are not

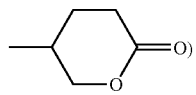)

in Formula IIb: $A^3$=O is

met is Li, MgBr$_2$, ZnBr$_2$, ZnCl$_2$ or Zn,
if Q is —CN, or —NCS, met must be a Zn-derivative or otherwise —CN or —NCS has to be introduced later
e.g. for —CN: Q=H→Q=Li→Q=I Q=CN
e.g. for —NCS

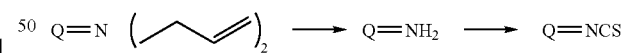

Scheme 2:

2a:

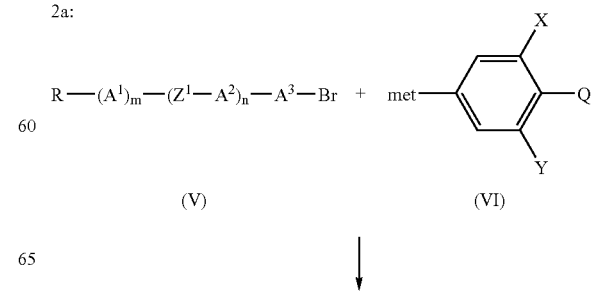

(V)     (VI)

-continued

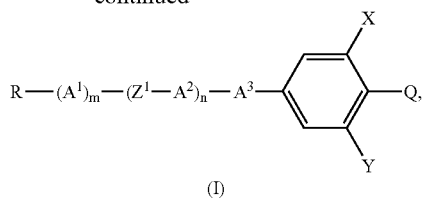

wherein p = 1

2b:

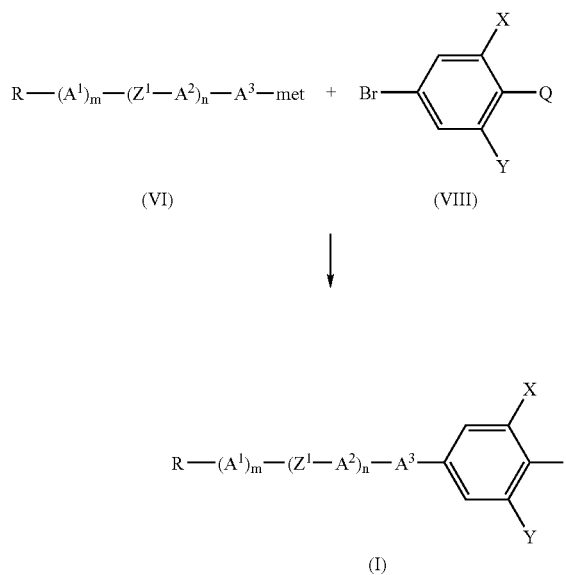

In schemes 2a and 2b Q is defined as in scheme 1; met in formulae VI and VII is defined as for formula III (in scheme 1) and is furthermore —B(OH)$_2$.

The precursor materials IIa are prepared according to scheme 3.

The precursor materials II, III, VI, and IX are accessible by general methods as described in handbooks like Houben-Weyl, Organic Reactions (Volume 1–55, John Wiley & Sons, *Organic Synthesis* (Collective Volume I–VI, Vol 39–75, John Wiley & Sons)), W. Theilheimer, Volume 1–50, *Synthetic Methods* (Karger Verlag-Basel). The bromides of formula VIII are commercially available.

The intermediates of formula II containing either in A$^1$ or A$^2$ the tetrahydropyran-2,5-diyl ring are prepared very similarly to scheme 3 as shown in scheme 4 (for A$^2$=tetrahydropyran-2,5-diyl).

Scheme 4:

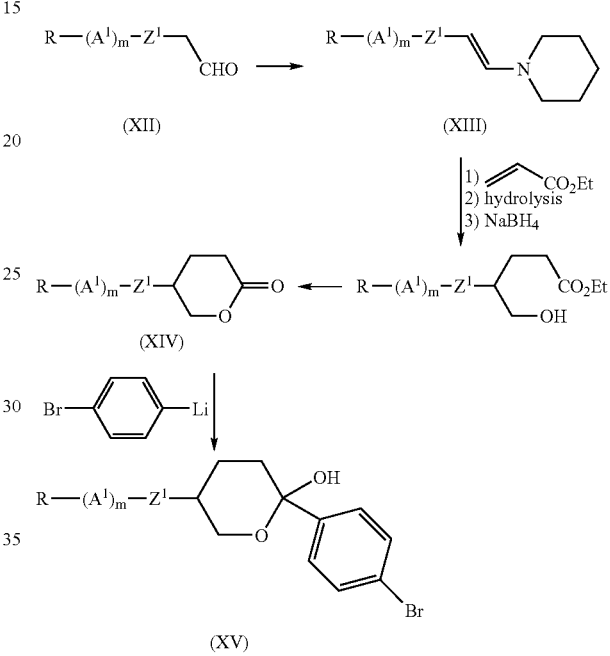

Scheme 3:

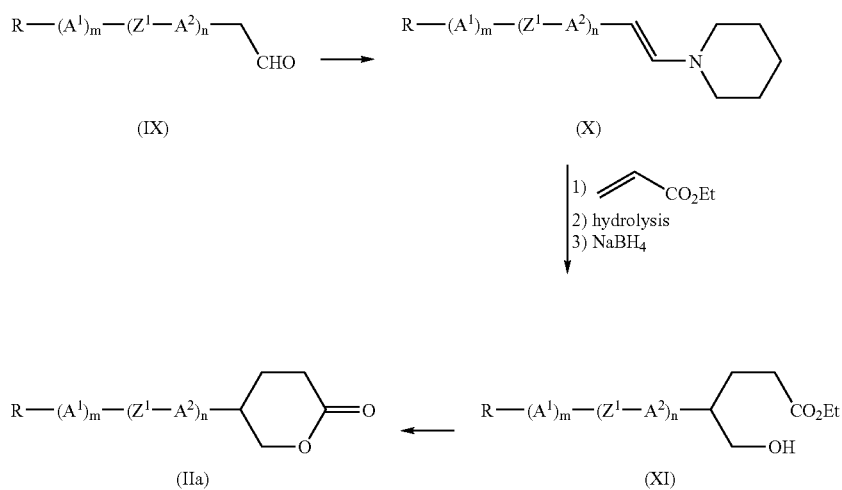

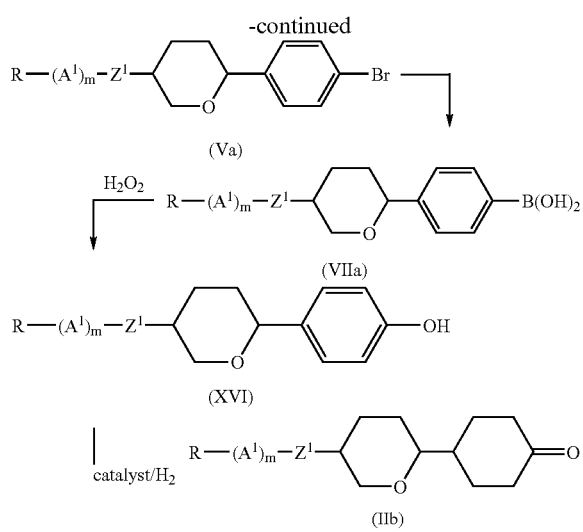

In case $A^1$ is tetrahydropyran-2,5-diyl the synthesis of the corresponding precursor is performed similarly to scheme 4 for the ring $A^1$ and the other compound-elements which are modified accordingly.

An example for a general approach to the intermediates of formulae V and VII is also shown in scheme 4 by the representatives of formula Va and VIIa. The cross couplings according to scheme 2 are performed for example under the Suzuki or Kumada/Negishi cross-coupling conditions by Pd- or Ni-catalysis (cat.).

The tetrahydropyran derivatives of formula I of the present invention are useful as components in liquid crystal compositions.

In a further embodiment the present invention therefore relates to the use of a tetrahydropyran derivative of formula I of the present invention as a component in a liquid crystal composition. The compounds of the present invention are especially useful in nematic liquid crystal compositions, especially in nematic liquid crystal compositions having a positive dielectric anisotropy. By using the tetrahydropyran derivatives of formula I of the present invention as components in liquid crystal compositions liquid crystal compositions having a broad nematic area, excellent chemical stability, excellent elastic properties, large $\epsilon_{195}$ at a positive dielectric anisotropy, low temperature dependence of the threshold voltage and/or low optical anisotropy are provided. Further, the tetrahydropyran derivatives of the present invention show a good solubility for other components of liquid crystal compositions, and a balanced property profile of the following parameters: rotational viscosity, dielectric anisotropy and holding ratio.

In a further embodiment of the present invention a liquid crystal composition is provided comprising at least two components including at least one tetrahydropyran derivative of formula I of the present invention.

The liquid crystal compositions of the present invention preferably contain at least one tetrahydropyran derivative of formula I of the present invention and in general 2 to 40, preferably 4 to 30, more preferably 7 to 25 further components. These further components are preferably selected from nematic or nematogenic (monotropic or isotropic) compounds, especially compounds of the classes of biphenyl, terphenyl, phenylbenzoate or cyclohexylbenzoate, cyclohexane carboxylic acid phenyl ester or cyclohexane carboxylic acid cyclohexyl ester, phenyl ester or cyclo hexyl ester of cyclohexyl benzoic acid, phenyl ester or cyclohexyl ester of cyclohexyl cyclohexane carboxylic acid, cyclohexyl phenyl ester of benzoic acid, cyclohexyl phenyl ester of cyclohexane carboxylic acid, cyclohexyl phenyl ester of cyclohexyl cyclohexane carboxylic acid, phenylcyclohexane, cyclohexylbiphenyl, phenylcyclohexyl cyclohexane, cyclohexyl cyclohexane, cyclohexyl cyclo hexene, cyclohexyl cyclohexyl cyclohexene, 1,4-bis-cyclohexylbenzene, 4,4-bis-cyclohexylbiphenyl, phenylpyrimidine, cyclohexylpyrimidine, phenyl-pyridine, cyclohexylpyridine, phenyldioxane, cyclohexyldioxane, phenyl-1,3-dithiane, cyclohexyl-1,3-ditiane, 1,2-diphenylethane, 1,2-dicyclohexylethylene, 1-phenyl-2-cyclhexylethane, 1-cyclohexyl-2-(4-phenylcyclohexyl)-ethane, 1-cyclohexyl-2-biphenylylethane, 1-phenyl-2-cyclohexylphenylethane and tolane. The 1,4-phenylene groups of said compounds may be fluorinated.

Instead of the ester-carboxylic linkage (—CO—O—) between a cyclohexyl ring or phenyl ring and a phenyl ring in the ester derivatives mentioned above linkages with the structure —CF$_2$O—, —CH═CH—, —C≡C—, —CF═CF—, or —CF$_2$—CF$_2$— may be incorporated.

The most preferred further components of the liquid crystal compositions of the present invention are characterized by the formulae A, B, C, D, E, and F:

| | |
|---|---|
| R'-L-E-R" | (A) |
| R'-L-CF$_2$O-E-R" | (B) |
| R'-L-COO-E-R" | (C) |
| R'-L-CH$_2$CH$_2$-E-R" | (D) |
| R'-L-CH═CH-E-R" | (E) |
| R'—L—C≡C—E—R" | (F) | wherein

L, E are each independently selected from the group consisting of -Phe-, -Cyc-, -Phe-Phe-, -Cyc-Phe-, -Cyc-Cyc-, -Pyr-, -Dio-, -G-Phe-, and -G-Cyc-; as well as the mirror images of the groups mentioned before, wherein Phe is unsubstituted 1,4-phenylene or substituted 1,4-phenylene, which is substituted by —F, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and G is 2-(trans-1,4-cyclohexyl)-ethyl, pyrimidine-2,5-diyl, pyridine-2,5-diyl, or 1,3-dioxane-2,5-diyl;

preferably at least one of the groups L and E is Cyc, Phe, or Pyr; more preferably E is Cyc, Phe or 1 Phe-Cyc.

In a preferred embodiment of the present invention the liquid crystal compositions of the present invention contain one or more components selected from the group consisting of formulae A, B, C, D, E, and F, wherein L and E are selected from the group consisting of Cyc, Phe, and Pyr and at the same time one or more components selected from compounds of formulae A, B, C, D, and E, wherein one of the groups L and E is selected from the group consisting of Cyc, Phe, and Pyr, and the other group is selected from the group consisting of -Phe-Phe, -Cyc-Phe-, -Cyc-Cyc-, -G-Phe-, and -G-Cyc, and optionally one or more components selected from the group consisting of the compounds of formulae A, B, C, D, E, and F, wherein the groups L and E are selected from the group consisting of -Cyc-Phe-, -Cyc-Cyc-, -G-Phe-, and -G-Cyc.

R' and R" each are independently of each other alkyl, alkenyl, alkoxy, alkenyloxy or alkanoyloxy having from 1 to 8 carbon atoms, preferably R' and R" are different and at least one of R' and R" is alkyl or alkenyl (group 1).

In a further embodiment R' is alkyl, alkenyl, alkoxy, alkenyloxy, or alkanoyloxy having from 1 to 8 carbon atoms, preferably alkyl or alkenyl, and R" is —CN, —CF$_3$, —OCF$_3$, —F, Cl, or NCS, preferably —F, —Cl, —CF$_3$, or —OCF$_3$ (group 2).

In general further combinations of the substituents mentioned in the compounds of formulae A, B, C, D, E, and F are possible. Many of the compounds mentioned above or mixtures of said compounds are buyable. All compounds mentioned above are preparable by methods known in the art or analogous methods which are known by a person skilled in the art.

The liquid crystal compositions of the present invention preferably comprise components of group 1 of the compounds as mentioned above as well as components of group 2 of the compounds as mentioned above. More preferably, the liquid crystal compositions of the present invention comprise 20 to 90% by weight, preferably 30 to 90% by weight of compounds of group 1 and 10 to 80% by weight, preferably 10 to 50% by weight of compounds of group 2, and at least one tetrahydropyran derivative of formula I of the present invention, wherein the sum of the parts of compounds of group 1, compounds of group 2 and tetrahydropyran derivatives of formula I of the present invention is 100% by weight.

Preferably the liquid crystal compositions of the present invention comprise 1 to 40% weight, more preferably 5 to 30% by weight of the tetrahydropyran derivatives of formula I of the present invention.

In a further embodiment of the present invention the liquid crystal compositions of the present invention comprise more than 40% by weight, preferably 45 to 90% by weight of the tetrahydropyran derivatives of formula I of the present invention.

The liquid crystal compositions of the present invention preferably comprise three, four, or five different tetrahydropyran derivatives of formula I of the present invention.

The liquid crystal compositions of the present invention are prepared in a manner known per se. In general, the components are solved in each other, preferably at elevated temperature.

As a rule, the desired amount of the components used in the smaller amount is dissolved in the components making up the main component, expediently at elevated temperature. It is also possible to mix solutions of the components in an organic solvent, for example in acetone, chloroform or methanol, and to remove the solvent again after thorough mixing, for example by distillation.

The liquid crystalline phases obtained with the liquid crystal compositions of the present invention may be modified so that they are suitable for use in all liquid crystal display devices known in the art.

Suitable additives are known by a person skilled in the art and are described in literature (see for example H. Kelker/R. Hatz, Handbook of Liquid Crystals, Verlag Chemie, Weinheim, 1980). Suitable additives are for example pleochroitic dyes for the preparation of colored guest-host-systems, or substances for changing the dielectric anisotropy, the viscosity and/or the orientation of the nematic phases, or stabilizers which prevent the oxidative influence of O$_2$ or destruction by radicals formed by light or otherwise.

Liquid crystal mixtures which contain one or more tetrahydropyran derivatives of formula I of the present invention and very particularly liquid crystal mixtures additionally comprising components or component mixtures as mentioned above have advantageous properties and correspond to the requirements described at the beginning. The tetrahydropyran derivatives of formula I of the present invention show a high dielectric anisotropy ($\Delta\epsilon$) and a balanced property profile of the rotational viscosity dielectric anisotropy and holding ratio. That compounds are very useful for the preparation of liquid crystal mixtures which are employed in order to achieve low threshold voltages. $\Delta n$ of the liquid crystal mixtures can be influenced by the proper selection of the components, as $\Delta n$ is mainly governed by the $\pi$-electrons present in the structural ring elements, linkage elements, and endgroup elements.

A further embodiment of the present invention relates to a liquid crystal display device constituted by the use of the liquid crystal compositions of the present invention.

Further, the present invention relates to an electro-optical display device constituted by the use of the liquid crystal composition of the present invention. These devices might be TN-cells (Schadt-Helfrich) or active matrix TFT-displays with high resolution.

The following examples are intended to illustrate the invention without limiting.

The symbols have the following meaning:

| | |
|---|---|
| K: | crystalline solid state, |
| S: | smectic phase (the index characterizes the phase type), |
| N: | nematic phase, |
| I: | isotrop phase. |

The number between two symbols gives the transition temperature in degrees Celsius.

The percentage data given are percentages by weight.

EXAMPLES

Example 1

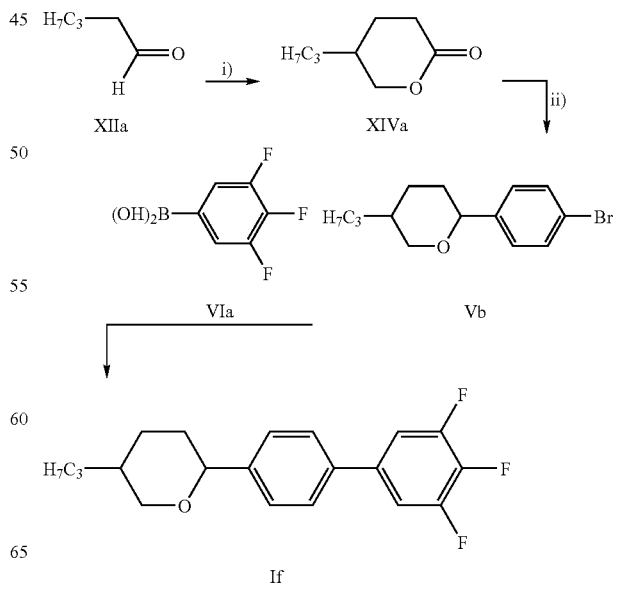

Synthesis of tetrahydropyran derivatives of formula I i) The preparation of the lacton XIVa from the aldehyde XIIa is performed analogously to the literature ((a) R. Baker, A. L. Boyes, C. J. Swain, *J Chem. Soc.* Perkin Trans. 1, 1990, 1415–1421; b) H. Hagiwava, T. Okabe, H. Ono, V. P. Kamat, T. Hoshi, T. Suzuki, M. Ando, *J. Chem. Soc.* Perkin Trans. 1, 2002, 895–990) and is obtained as woodruff scenting liquid in 35% yield.

filtrate is evaporated to dryness and the residue is crystallized from heptane delivering the corresponding If as white crystals (yield 72%).

Similarly to If are prepared under variation of the corresponding groups $A^1$, $A^2$, $A^3$, m, n, p, x, y, Q the inventive compounds Ib, c, d, e, g, I, j, k, l, m, n, q, r, s, t, as disclosed in table 1.

Example 2

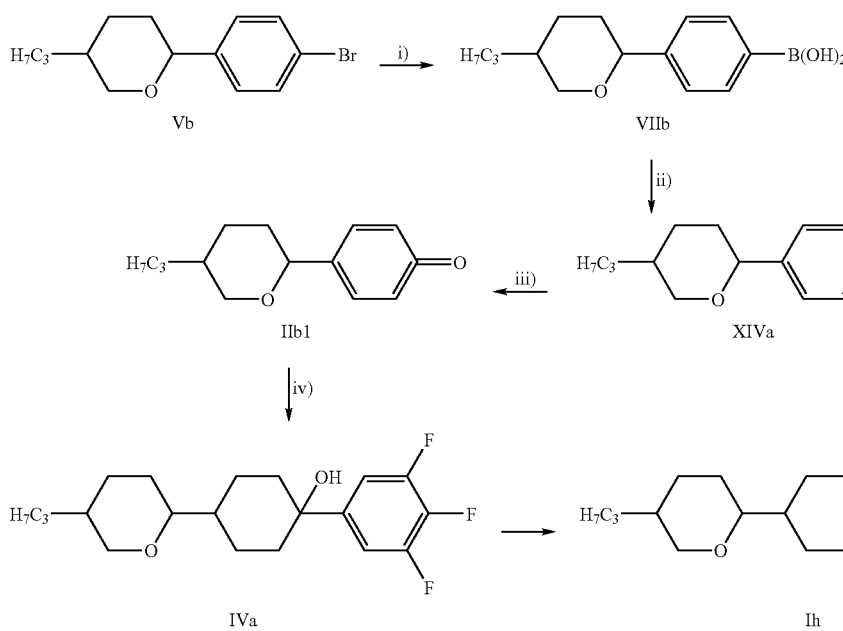

ii) To a solution of 207 mmol of 1,4-dibromobenzene in 250 ml diethylether is added at −50° C. drop by drop a solution of 207 mmol butyllithium (15% in hexane). Then a solution of 170 mmol of XIVa is added dropwise at −50° C. under stirring to the solution comprising the lithiated bromobenzene. After stirring for additional 30 minutes the temperature is increased to 0° C. and the intermediate 2-(4-Bromophenyl)-2-hydroxy-5-propyltetrahydropyran is worked up as usual by quenching with cold $NH_4Cl$-solution and isolating the raw material by evaporation of the dried organic phase.

The raw material (51 g) is dissolved in 400 ml dichloromethane and at −75° C. 400 ml triethylsilane are added. Then 400 mmol of boron trifluoride etherate are added dropwise to this solution keeping the temperature at −70° C. Then the temperature is allowed to increase to 10° C. and the mixture is hydrolyzed with saturated $NaHCO_3$-solution and worked up as usual. The isolated raw material of Vb is a 9:1 mixture of the corresponding trans/cis isomers. After crystallization from pentane 30.6 g of trans Vb are obtained (61%).

iii) To 0,1 mol of Vb, 0.15 mol of $K_3PO_4$ in 200 ml of a 4:1 mixture of tetrahyrofuran/water are added at 80° C. 0.1 mol of 3,4,5.trifluorobornic acid (prepared in the usual way from the Grignard-compound and trimethylborate) and 2 mol % of $PdCl_2$-$2P(Ph)_3$ under stirring. After continuous heating and stirring for six hours the reaction mixture is worked up as usual by isolating and evaporating the organic phase. After filtrating the isolated raw material in an heptane/toluene solution over silica, the i) To 73 mmol of Vb, prepared according to example 1, in 200 ml tetrahydrofuran cooled to −70° C. are added dropwise 73 mmol butyllithium (15% in hexane) followed of 73 mmol trimethylborate in 50 ml of tetrahydrofuran. The reaction mixture is warmed up to 0° C. and then mixed with 2n HCL to pH 2. The raw material isolated from the organic phase is treated with hot heptane to extract unpolar impurities. The resulting crystals VIIb (72%) are used in the next step.

ii) A mixture of 60 mmol of VIIb, 300 ml of toluene, 120 mmol NaOH, 50 ml of water and 30 ml of $H_2O_2$ is stirred for two hours at 45° C. Then, after cooling to room temperature the mixture is acidified with 10% HCl to pH 2 and worked up by isolating the organic phase which yields after evaporation and recrystallization from heptane XIVa (52%).

iii) 32 mmol XIVa are hydrogenated in 100 ml xylene in the presence of 2,0 g wet 5% Pd/C-catalyst at 5 bar and 130° C. for 28 hours. After usual work up IIb1 is obtained as colourless oil (65%).

iv,v) 21 mmol of IIb1 in 25 ml of tetrahydrofuran are added to a Grignard solution prepared from 25 mmol of magnesium under stirring at room temperature. After one hour of additional heating to reflux the resulting hydroxyl compound IVa is isolated and reduced to Ih as described in example 1 for the reduction to Vb.

Similarly to Ih are prepared under variation of the corresponding structural elements Ia, Io, Ip (as disclosed in table 1).

In table 1 the tetrahydropyran derivatives prepared and their properties are disclosed.

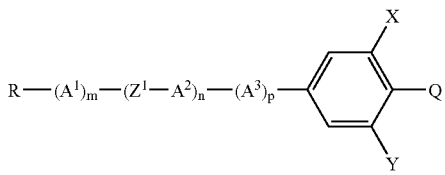

(I)

| | R | m | n | p | Z¹ | A¹ | A² | A³ | X | Y | Q | $\Delta\epsilon$ | $\epsilon_\perp$ | $\Delta n$ | $n_o$ | |
|---|---|---|---|---|---|---|---|---|---|---|---|---|---|---|---|---|
| a | $C_2H_5$ | 0 | 1 | 1 | single bond | — | thp | cyc | F | F | F | 14,0 | 6,2 | 0,0475 | 1,4832 | K 72 1 |
| b | $C_3H_7$ | 0 | 1 | 1 | single bond | — | cyc | thp | F | F | F | 12,2 | 5,7 | 0,0710 | 1,4752 | K 57 N (50,9)1 |
| c | $C_2H_5$ | 0 | 1 | 1 | single bond | — | thp | phe | F | F | F | 14,5 | 7,1 | 0,1159 | 1,5031 | K 52 1 |
| d | $C_3H_7$ | 0 | 1 | 1 | single bond | — | cyc | thp | F | F | $OCF_3$ | 13,5 | 5,6 | 0,0770 | 1,4522 | K 69 N 69,9 1 |
| e | $C_3H_7$ | 1 | 1 | 1 | single bond | cyc | cyc | thp | F | F | F | 11,8 | 4,4 | 0,1020 | 1,4832 | K 113 N 255,9 1 |
| f | $C_3H_7$ | 0 | 1 | 1 | single bond | — | thp | phe | F | F | F | 14,8 | 5,8 | 0,1243 | 1,5015 | K 41 1 |
| g | $C_3H_7$ | 0 | 1 | 1 | single bond | — | thp | phe | F | F | $OCF_3$ | 18,0 | 5,7 | 0,1256 | 1,4753 | K 58 SmA (37) N 61 1 |
| h | $C_3H_7$ | 0 | 1 | 1 | single bond | — | thp | cyc | F | F | F | 14,1 | 5,7 | 0,0599 | 1,4822 | K 71 1 |
| i | $C_3H_7$ | 0 | 1 | 1 | single bond | — | thp | phe | F | H | F | 9,6 | 5,4 | 0,1430 | 1,5122 | K 50 SmA-1 (32) SmA-2 64 N 98.6 1 |
| j | $C_3H_7$ | 0 | 1 | 1 | single bond | — | thp | phe | F | H | $OCF_3$ | 12,7 | 5,5 | 0,1380 | 1,4822 | K 45 SmA-1 68 SmA-2 118 1 |
| k | $C_3H_7$ | 1 | 1 | 1 | single bond | thp | phe | phe-F | F | F | F | 20,9 | 5,3 | 0,2243 | 1,5103 | K 76 SmA 132 N 207 1 |
| l | $C_2H_5$ | 0 | 1 | 1 | single bond | — | thp | phe | H | H | $OCF_3$ | 10,1 | 4,4 | 0,1422 | 1,4893 | K 54 Sm ? 87 SmB 154 SmA 168 1 |
| m | $C_3H_7$ | 1 | 1 | 1 | single bond | — | thp | phe-F | F | F | F | 17,3 | 7,5 | 0,1071 | 1,4953 | K 641 |
| n | $C_3H_7$ | 0 | 1 | 1 | single bond | — | thp | phe-F | F | H | F | 12,7 | 7,3 | 0,1254 | 1,4975 | K 43 N 43, 7 1 |
| o | $C_3H_7$ | 0 | 1 | 0 | single bond | — | thp | — | F | F | CN | 35,6 | 15,1 | 0,0580 | 1,4842 | K 27 1 |
| p | $C_3H_7$ | 1 | 1 | 1 | single bond | thp | cyc | phe-F | F | F | F | 19,7 | 5,3 | 0,1384 | 1,4930 | K 74 N 197,6 1 |
| q | $C_2H_5$ | 0 | 1 | 1 | single bond | — | thp | phe-F | F | H | F | 12,3 | 7,8 | 0,1167 | 1,5028 | K 28 N (10,6) 1 |
| r | $C_2H_5$ | 0 | 1 | 1 | single bond | — | thp | phe-F | F | H | $OCF_3$ | 15,2 | 7,6 | 0,1100 | 1,4762 | K37 SmA (35) N 38,8 1 |
| s | $C_2H_5$ | 0 | 1 | 1 | single bond | — | thp | phe-F | F | F | F | 17,8 | 8,3 | 0,0920 | 1,5003 | K 68 1 |
| t | $C_2H_5$ | 0 | 1 | 1 | single bond | — | cyc | thp | H | H | $OCF_3$ | 8,5 | 4,4 | 0,0810 | 1,4662 | K 37 SmB 93 N 105,5 1 | thp tetrahydropyran-2,5-diyl
$\Delta\epsilon$ dielectric anisotropy
phe 1,4-phenylene
$\epsilon_\perp$ dielectric constant (perpendicular)
cyc trans-1,4-cyclohexylene
$\Delta n$ optical anisotropy
phe-F 3-F substituted 1,4-phenylene
$n_o$ ordinary refractive index The entire disclosure of all applications, patents and publications, cited herein and of corresponding European application No. 03011906.9 filed May 27, 2003, is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for preparing a tetrahydropyran compound of formula I

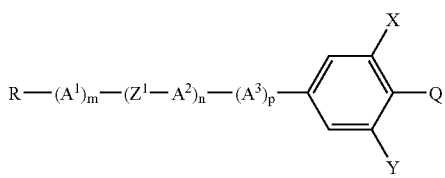

in which

R is H, or an alkyl group having 1 to 12 C atoms, which is unsubstituted or substituted by at least one halogen atom or —CN, in which one or more non adjacent CH$_2$-groups are optionally, each independently, replaced by —O—, —S—, —CO—, —CF$_2$—,

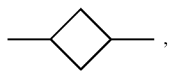

CO—O—, —O—CO—, or —CH=CH—,
A$^1$, A$^2$, A$^3$ are, each independently,
a) trans-1,4-cyclohexylene
b) tetrahydropyran-2,5-diyl,
c) 1,4-phenylene, in which one or more non adjacent CH-groups are optionally replaced by N,
d) 1,4-bicyclo[2.2.2]octylene, piperidine-2,5-diyl,
e) naphthalene-2,6-diyl,
f) decahydronaphthalene-2,6-diyl,
g) 1,2,3,4-tetrahydronaphthalene-2,6-diyl, or
h) 1,4-cyclohexenylene,
wherein the groups listed under c), e) and g) are optionally substituted with —CN, —Cl, —F or OCF$_3$, and
wherein at least one of the groups A$^1$, A$^2$, or A$^3$ is tetrahydropyran-2,5-diyl,
Z$^1$ is —CO—O—, —CH$_2$O—, —O—, —O—CH$_2$—, —CH$_2$CH$_2$—, —CH=CH—, —C≡C—, or a single bond,
m is 0, 1, or 2,
n and p are, each independently, 0, 1 or 2,
and m+n+p is 2, 3 or 4,
X, Y are, each independently, —H or —F, wherein at least one of X and Y is —F, and
Q is H, —CN, —NCS, —F, —Cl, —CF$_3$, SF$_5$, —OCF$_2$CHFCF$_3$, —OCF$_3$, —OCHF$_2$, —OCHFCF$_3$, or —OCF$_2$CF$_3$,
comprising a reaction that proceeds according to the following reaction scheme:

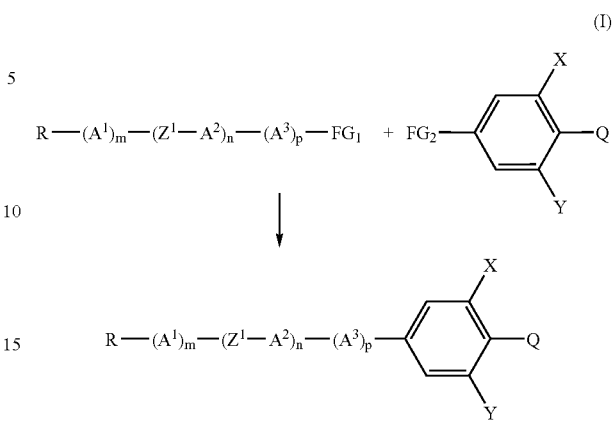

wherein FG$_1$ and FG$_2$ are the following:

| -FG$_1$ | -FG$_2$ |
|---|---|
| =O | a metal containing group, which is Li, MgBr$_2$, ZnBr$_2$, ZnCl$_2$ or Zn |
| —Br | a metal containing group, which is Li, MgBr$_2$, ZnBr$_2$, ZnCl$_2$ or Zn |
| a metal containing group, which is Li, MgBr$_2$, ZnBr$_2$, ZnCl$_2$ or Zn | —Br. |

2. A process according to claim 1, wherein m is 0 or 1 and n and p are, each independently, 0 or 1.

3. A process according to claim 1, wherein X, Y, and Q are —F.

4. A process according to claim 1, wherein one of X and Y is —F and Q is —OCF$_3$.

5. A process according to claim 1, wherein at least one of A$^1$, A$^2$, and A$^3$ is trans-1,4-cyclohexylene or one or two of A$^1$, A$^2$, and A$^3$ are 1,4-phenylene, in which one or more non adjacent CH-groups are optionally replaced by N, or CF.

6. A process according to claim 1, wherein the compound of formula I is of formula (IA)

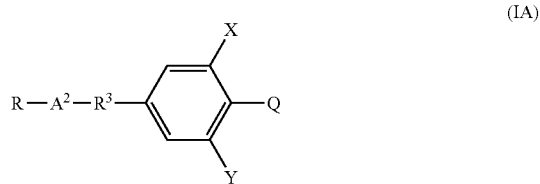

in which

R is H, or an alkyl group having 1 to 12 C atoms, which is unsubstituted or substituted by at least one halogen atom or —CN, in which one or more non adjacent CH$_2$-groups are optionally, each independently, replaced by —O—, —S—, —CO—, —CF$_2$—,

—CO—O—, —O—CO—, or —CH=CH—, $A^2$, $A^3$ are, each independently,
a) trans-1,4-cyclohexylene,
b) tetrahydropyran-2,5-diyl, or
c) 1,4-phenylene, in which one or more non adjacent CH-groups are optionally replaced by N or CF,
wherein at least one of the groups $A^2$ or $A^3$ is tetrahydropyran-2,5-diyl,
X, Y are, each independently, —H or —F, wherein at least one of X and Y is —F, and
Q is H, —CN, —NCS, —F, —Cl, —CF$^3$, —OCF$_3$, —OCHF$_2$, —OCHFCF$_3$, or —OCF$_2$CF$_3$.

7. A process according to claim 1, further comprising bringing the compound of formula I into a liquid crystal composition.

8. A process according to claim 7, further comprising adding the liquid crystal composition into a liquid crystal display.

9. A process according to claim 7, further comprising adding the liquid crystal composition into an electro-optical display.

* * * * *

UNITED STATES PATENT AND TRADEMARK OFFICE
CERTIFICATE OF CORRECTION

PATENT NO.       : 7,022,865 B2
APPLICATION NO.  : 10/854773
DATED            : April 4, 2006
INVENTOR(S)      : Mark John Goulding et al.

It is certified that error appears in the above-identified patent and that said Letters Patent is hereby corrected as shown below:

Column 18, line 50, in formula (IA), reads

" 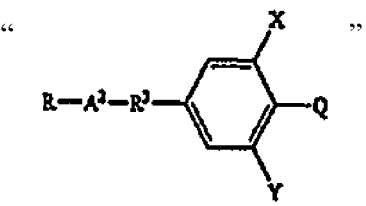 "

should read

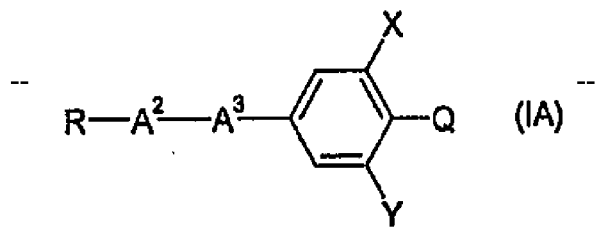

Column 19, line 10, reads "-CF$^3$," should read -- -CF$_3$, --

Signed and Sealed this

Twenty-seventh Day of February, 2007

JON W. DUDAS
*Director of the United States Patent and Trademark Office*